Aug. 28, 1934.  E. WALDER  1,971,970
AUTOMATIC CONTROL FOR ELECTRICAL APPLIANCES
Filed Dec. 15, 1931   2 Sheets-Sheet 1

INVENTOR.
Emil Walder
BY
Herbert S. Fairbanks
ATTORNEY.

Aug. 28, 1934.    E. WALDER    1,971,970
AUTOMATIC CONTROL FOR ELECTRICAL APPLIANCES
Filed Dec. 15, 1931    2 Sheets-Sheet 2
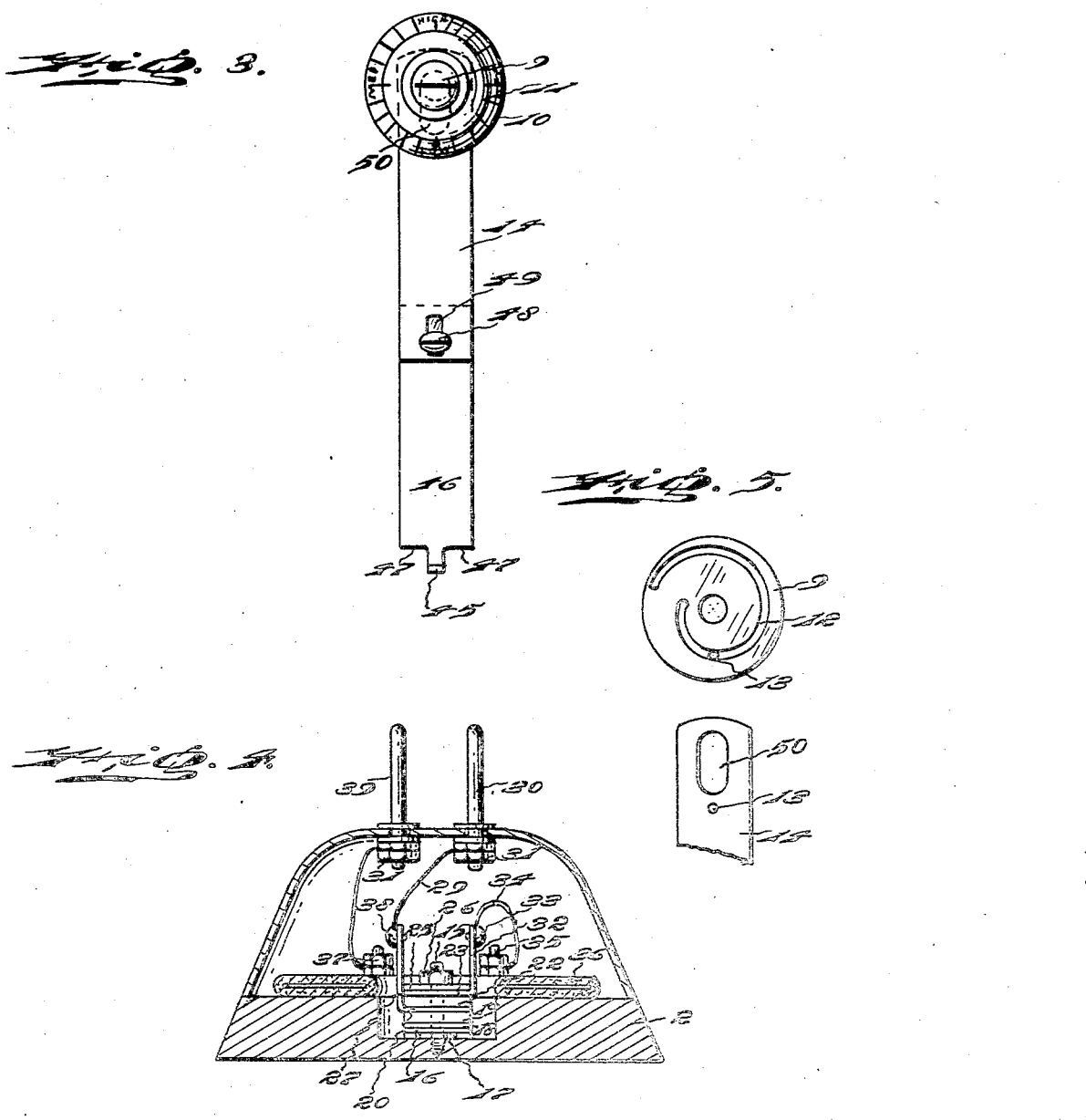
INVENTOR.
Emil Walder
BY
Herbert H. Fairbanks
ATTORNEY.

Patented Aug. 28, 1934

1,971,970

UNITED STATES PATENT OFFICE 1,971,970

AUTOMATIC CONTROL FOR ELECTRICAL APPLIANCES

Emil Walder, Philadelphia, Pa., assignor to National Stamping & Electric Works, Chicago, Ill., a corporation of Illinois Application December 15, 1931, Serial No. 581,116

2 Claims. (Cl. 219—25)

One object of this invention is to devise a novel automatic heat controlled electric circuit for electric appliances wherein the movable contact is not carried by the thermostatic element but by a spring which is actuated by the thermostat.

A further object of this invention is to devise novel manually controlled means located away from the heat zone of the electrical appliance and adjustable to vary the degree of temperature at which the electric circuit is opened and closed.

A further object of this invention is to devise a novel automatic electric iron with novel means for manually adjusting it for a desired standard of temperature.

With the above and other objects in view, as will hereinafter clearly appear, my invention comprehends a novel automatic heat controlled electric circuit and a novel manual adjustment therefor.

It further comprehends a novel electric iron having embodied in it a novel construction and arrangement of a thermostatically controlled electric switch and novel manually controlled means for adjusting its setting.

Other novel features of construction and advantage will hereinafter appear in the detailed description and the appended claims.

For the purpose of illustrating the invention, I have shown in the accompanying drawings a typical embodiment of it, which, in practice, will give satisfactory and reliable results. It is, however, to be understood that this embodiment is typical only and that the various instrumentalities of which my invention consists can be variously arranged and organized, and the invention is not limited to the precise arrangement and organization of these instrumentalities as herein set forth.

Figure 3 is an end elevation of the manual control.

Figure 4 is a section on line 4—4 of Figure 1.

Figure 5 is a rear elevation of the manually actuated heat control member and a portion of the strip cooperating therewith.

Similar numerals of reference indicate corresponding parts.

Referring to the drawings:—

Figure 1:
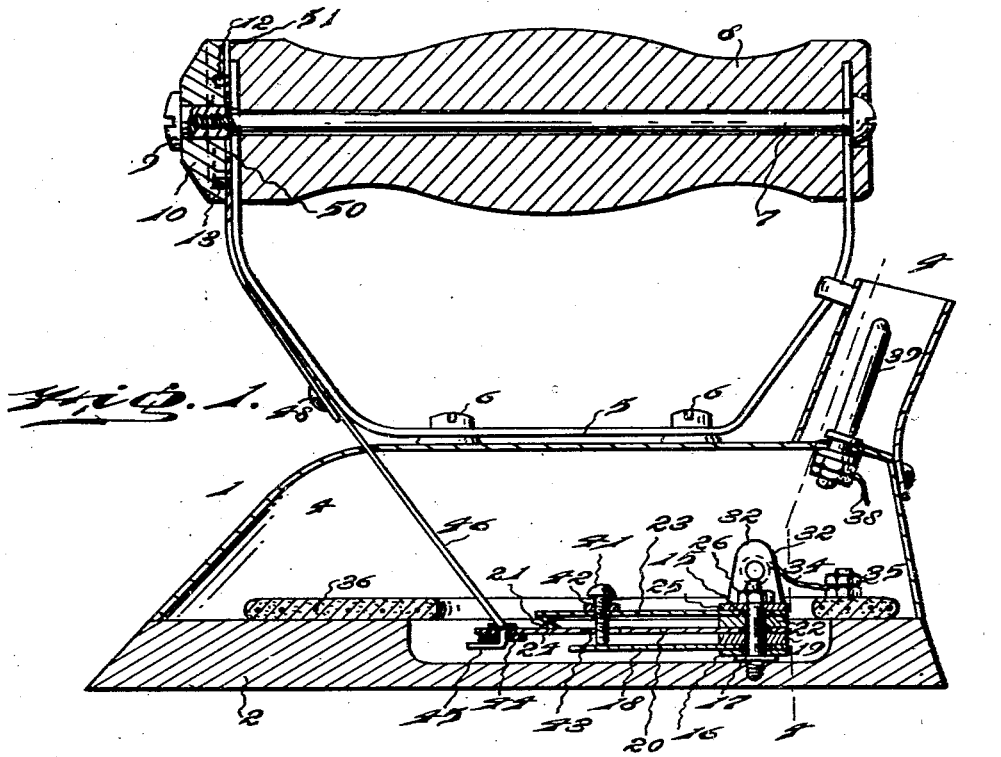
Figure 1 is a sectional elevation of an electric heat appliance in conjunction with which an automatically heat controlled switch, embodying my invention, is employed.
Figure 2:
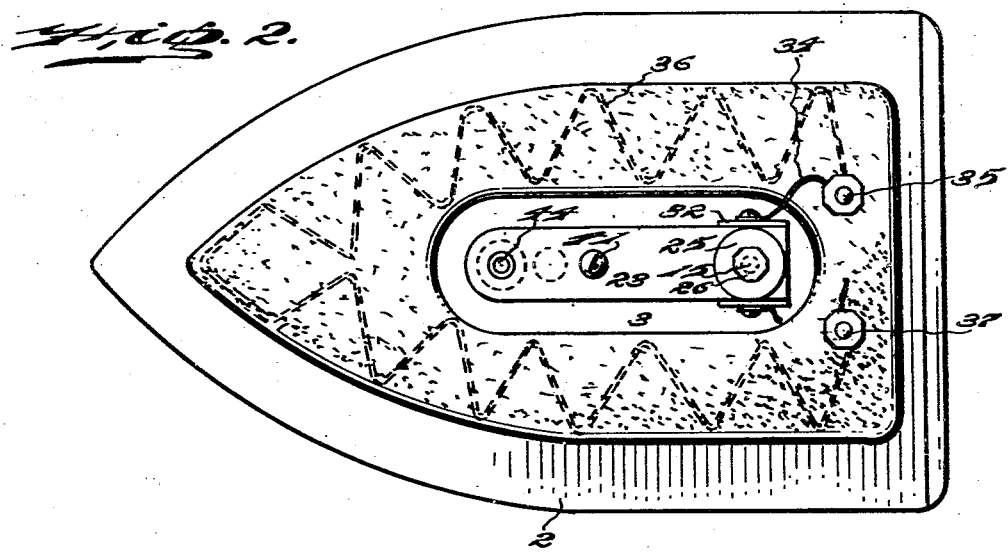
Figure 2 is a plan view of the base of the iron, with the top portion removed.

1 designates an electrically heated electric appliance in conjunction with which the present invention is employed.

For purpose of illustration, this electric heating appliance has been illustrated in the form of an internally heated electric iron, but it is to be understood that the thermostatically controlled switch herein disclosed is capable of embodiment in other types of electric heating appliance.

The iron is provided with a base 2 having a longitudinally extending recess 3 which opens through the upper end of such base. The top portion 4 is secured to the base in any desired or conventional manner and is adapted to receive the handle bracket 5 secured thereto by means of fastening devices 6. This bracket is in the form of a strip of material having its end portions upwardly deflected and apertured to receive a headed rod 7 which passes through the grasping portion 8 of the handle and is in threaded engagement with a coupling nut 9 which carries a dial 10 having its outer face graduated, as at 11. This dial has also indicated thereon the words "Off" "Low" "Medium" and "High". These words are located progressively ninety degrees apart around the periphery of the dial 10.

The rear face of the dial is provided with an eccentric groove 12 into which extends a pin 13 carried by a strip 14 which is operatively connected to a thermostatically control switch mechanism to provide for its manual setting so that the electric circuit of the heating appliance will open and close at a predetermined temperature, selectable at the will of the operator.

The thermostatic switch is secured in position by means of a rod 15 in threaded engagement with the base 2 and passing through an insulating disc 16 resting on a collar 17 integral with the rod 15. The rod 15 also passes through the apertured end of a strip 18 of heat responsive material, such as, for example, a bi-metallic strip such as is commonly employed in thermostats. This strip, however, does not have any contact carried by it. The rod 15 also passes through an insulating disc 19 preferably of lava which contacts with the bi-metallic strip 18. Above the lava strip 19 is located the stationary, but flexible, carrying member 20 for the stationary contact 21. This contact carrying member 20 is apertured to receive the rod 15 and above it, is located an insulating disc 22, preferably of lava. The rod 15 also passes through the apertured end of a flexible contact carrying member 23, to the opposite end of which is connected, a contact 24 which forms the movable contact to cooperate with the relatively stationary contact 21. Above the stationary carrying member 23 is an insulating disc 25 against which bears the nut 26 which latter secures the bi-metallic strip 18 and the contact carrying members 20 and 23, in assembled condition with the base of the iron, and in spaced insulated relationship.

The contact carrying member 20, at its rear end, is upwardly deflected to form an upwardly extending flange 27 which is provided with a binding screw 28 to connect the conductor 29 with the prong 30 of the electric iron, said prong being provided with a nut 31 in threaded engagement therewith to electrically connect the conductor 29 with such prong 30.

The contact carrying member 23 is upwardly deflected to form a flange 32 having a binding screw 33 to secure in position the electrical conductor 34 which is connected with the binding post 35 of the heating element 36. The other binding post of the heating element 36, namely, 37, is connected by a conductor 38 to the other prong 39 of the electric iron.

The contact carrying member 23 has a set screw 41 in threaded engagement with it and a lock nut 42 is provided to retain it in the position to which it is adjusted. This set screw 41 forms a connecting member with the thermostatic element 18 and passes through an aperture 43 in the contact carrying member 20 so that it contacts with the thermostatic element. The contact carrying member 20 at its outer end is apertured to receive an insulated bushing 44 into which extends a hook 45 of a connecting strip 46 provided with the shoulders 47. This strip 46 is adjustably connected with the strip 14 by means of a set screw 48 passing through a slot 49 in the strip 14 and in threaded engagement with the strip 46. This provides for varying the effective length of the strips 14 and 16. The strip 14 is preferably provided with an aperture 50 through which the rod 7 passes. The graduations on the dial 10 are adapted to be brought into registry with a graduation 51 which is diagrammatically illustrated in Figure 1.

The operation of my novel heat control for electrical appliances will now be apparent to those skilled in the art to which this invention appertains and is as follows:

Special attention is directed at this point to the fact that the heat responsive element, such as, the thermostatic element 18, does not carry a contact but is effective to move the movable contact in one direction the movable contact being carried by a spring carrying member 23 while the relatively stationary contact is carried by the spring strip 20. The operator by turning the dial 10 adjusts the relatively stationary contact 21 for the degree of temperature at which the circuit is to be opened and closed. It will be apparent that by turning the dial 10 the pin carried by the strip 14 and extending into the eccentric groove in the dial will cause the movement in one direction or the other of the strip 46 and thereby vary the fixed position of the end portion of the contact carrying member 20 which carries the relatively stationary contact 21. In this manner the thermostatic switch may be set to operate at any desired degree of temperature. As the thermostatic member 20 receives heat from the base of the iron 2, for example, it will deflect thereby moving the contact carrying member 23 outwardly when the determined degree of temperature is reached so that the contact 24 will move out of contact with the contact 21.

Special attention is directed to the fact that the thermostatic element is free to move without restraint as it does not have mounted on it a contact as is customary in this art. The flow of current will be apparent to those skilled in this art, it being seen that one line from one of the prongs to one of the binding posts of the heating elements is provided with a thermostatic switch which can be manually set by the operator to effect the opening and closing of the circuit at any desired temperature. The connection between the dial 10 and the contact carrying member 20 is adjustable in order that the effective length of such connection may be varied to provide for the proper setting of the dial.

It will now be apparent that I have devised a new and useful automatic control for electrical appliances which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In an electric heating appliance, provided with a grasping handle, a heating element, a thermostatically controlled switch for said heating element, a manually actuated dial rotatably mounted on said handle and having an eccentric groove, a connection from said dial having a hooked end to engage said switch for adjusting it to open and close the circuit at a desired temperature and having a pin extending into said groove, and means to vary the effective length of said connection.

2. In an electric flat iron, a base, a grasping handle connected therewith, a heating element on said base, an automatic heat controlling switch for said heating element, a dial rotatably carried by said handle and provided with an eccentric groove, and a connection having means extending into said groove, and operatively connected with said switch to adjust it to open and close at a predetermined temperature.

EMIL WALDER.